(12) United States Patent
Takemura et al.

(10) Patent No.: US 11,323,008 B2
(45) Date of Patent: May 3, 2022

(54) MAGNETIC BEARING CONTROLLER AND MAGNETIC BEARING CONTROL METHOD

(71) Applicant: KAWASAKI JUKOGYO KABUSHIKI KAISHA, Kobe (JP)

(72) Inventors: Soichiro Takemura, Akashi (JP); Kazuma Tokuyama, Kobe (JP); Tsuyoshi Koga, Kobe (JP); Yuki Seki, Kobe (JP); Suguru Takata, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 17/252,628

(22) PCT Filed: Apr. 1, 2019

(86) PCT No.: PCT/JP2019/014421
§ 371 (c)(1),
(2) Date: Dec. 15, 2020

(87) PCT Pub. No.: WO2019/239682
PCT Pub. Date: Dec. 19, 2019

(65) Prior Publication Data
US 2021/0273521 A1     Sep. 2, 2021

(30) Foreign Application Priority Data
Jun. 15, 2018  (JP) .............................. JP2018-114788

(51) Int. Cl.
*H02K 7/09* (2006.01)
*H02P 6/28* (2016.01)
(Continued)

(52) U.S. Cl.
CPC ............. *H02K 7/09* (2013.01); *F16C 32/048* (2013.01); *F16C 32/0453* (2013.01);
(Continued)

(58) Field of Classification Search
CPC ..... H02K 7/09; H02P 6/28; H02P 6/18; H02P 23/0004; F16C 32/0453; F16C 32/0455;
(Continued)

(56) References Cited

U.S. PATENT DOCUMENTS 5,562,528 A * 10/1996 Ueyama ................ B24B 41/044
310/90.5
6,346,757 B1 * 2/2002 Shinozaki ........... F16C 32/0457
310/90.5
(Continued)

FOREIGN PATENT DOCUMENTS

EP          2818739 A1    12/2014
JP     2013-079678 A      5/2013
(Continued)

*Primary Examiner* — Ahmed Elnakib
(74) *Attorney, Agent, or Firm* — Oliff PLC

(57) ABSTRACT

A magnetic bearing controller for controlling a magnetic levitation motor, the magnetic levitation motor including: a rotor; a pair of electromagnets that causes the rotor to levitate by electromagnetic force; an auxiliary bearing that supports a rotating shaft of the rotor when the rotor is stopped; and a rotor position detector that detects the rotor's position in a levitation direction. The magnetic bearing controller includes an operation current generator that generates an operation current value corresponding to a deviation between a position command value and the rotor's position detected by the rotor position detector. The operation current generator is configured to give a predetermined initial value greater than 0 to the operation current value at a start of levitation for causing the rotor in a state where the rotating shaft of the rotor is supported by the auxiliary bearing to levitate and be positioned at a predetermined target position.

5 Claims, 8 Drawing Sheets

(51) Int. Cl.
  *F16C 32/04* (2006.01)
  *H02P 6/18* (2016.01)
  *H02P 23/00* (2016.01)

(52) U.S. Cl.
  CPC ...... *F16C 32/0455* (2013.01); *F16C 32/0457* (2013.01); *H02P 6/18* (2013.01); *H02P 6/28* (2016.02); *H02P 23/0004* (2013.01); *F16C 2380/26* (2013.01)

(58) Field of Classification Search
  CPC . F16C 32/0457; F16C 32/048; F16C 2380/26
  USPC ........................................................ 310/90.5
  See application file for complete search history.

(56) References Cited

U.S. PATENT DOCUMENTS

| | | | | |
|---|---|---|---|---|
| 6,429,561 B1 * | 8/2002 | Davis | ................ | F16C 32/0444 |
| | | | | 310/68 B |
| 6,515,387 B1 * | 2/2003 | Shinozaki | ........... | F16C 32/0451 |
| | | | | 310/90.5 |

FOREIGN PATENT DOCUMENTS

| | | | |
|---|---|---|---|
| JP | 2013079678 | * | 5/2013 |
| KR | 2012-0124734 A | | 11/2012 |

* cited by examiner

MAGNETIC BEARING CONTROLLER AND MAGNETIC BEARING CONTROL METHOD

TECHNICAL FIELD

The present invention relates to a magnetic bearing controller for and a magnetic bearing control method of controlling a magnetic levitation motor.

BACKGROUND ART

There is a known magnetic levitation motor that includes a magnetic bearing as the bearing of the rotor of the motor. The magnetic bearing uses electromagnets to cause the rotor to rotate in a levitated manner. Such a magnetic levitation motor includes, for example: a rotor whose rotating shaft is disposed horizontally; a pair of electromagnets disposed above and below the rotor, respectively, the electromagnets causing the rotor to levitate by electromagnetic force; an auxiliary bearing that supports the rotor when the rotor is stopped; a rotor position detector that detects the position of the rotor in the vertical direction; and a magnetic bearing controller that controls the levitation position of the rotor.

In the control of the levitation position of the rotor, the magnetic bearing controller performs feedback control, such as PID control. Specifically, the magnetic bearing controller applies an electric current to the rotor, and the applied electric current is determined based on the following currents: an operation current that is determined based on a deviation between a position command value and the rotor position detected by the rotor position detector; and an electric current that is determined based on a predetermined bias current.

Conventionally, at the start of levitation of the rotor, a position command value that is a ramp value is inputted for causing the rotor that is supported by the auxiliary bearing (i.e. the rotor in a non-levitating state) to levitate and be positioned at a predetermined target position (a steady position of the rotor). Specifically, at the start of levitation, assuming that the position of the rotor stopped on the auxiliary bearing (i.e., the initial position of the rotor) is 0, then a position command value that proportionally increases from 0 to a target position (i.e., the initial value in this case is 0) is inputted to the magnetic bearing controller.

CITATION LIST

Patent Literature

PTL 1: Japanese Laid-Open Patent Application Publication No. 2013-79678

SUMMARY OF INVENTION

Technical Problem

In such conventional control at the start of levitation, after the application of current to the electromagnets is started, it takes some time before the rotor separates from the auxiliary bearing, and during this time, excessive vibration of the rotor may occur, or the rotor and the auxiliary bearing collide with each other multiple times due to such vibration. If the vibration of the rotor or the collision of the rotor and the auxiliary bearing with each other occurs, a noise may be caused or the auxiliary bearing may get damaged.

Other modes of control performed at the start of levitation of the rotor include, for example, one disclosed in Patent Literature 1. In the mode of control disclosed in Patent Literature 1, in order to cause the rotor to levitate to a target position (a reference position), target positions are set in a stepped manner (i.e., the rotor is stopped temporarily at a position that is located between the position where the rotor is supported by the auxiliary bearing and the final target position). This makes it possible to prevent an overshoot, in which the rotor levitates rapidly due to the rotor being moved to the target position at once and consequently moves beyond the target position, colliding with an upper auxiliary bearing.

However, even if the control mode as described in Patent Literature 1 is adopted, the above-described problems, such as the rotor's vibration occurring before the rotor separates from the auxiliary bearing, cannot be solved.

The present invention has been made in view of the above-described problems. An object of the present invention is to provide a magnetic bearing controller and a magnetic bearing control method that are capable of suppressing the rotor from, for example, vibrating on the auxiliary bearing and repeatedly separating from and coming into contact with the auxiliary bearing at the start of levitation of the rotor.

Solution to Problem

A magnetic bearing controller according to one aspect of the present invention is a magnetic bearing controller for controlling a magnetic levitation motor, the magnetic levitation motor including: a rotor; a pair of electromagnets that causes the rotor to levitate by electromagnetic force; an auxiliary bearing that supports a rotating shaft of the rotor when the rotor is not levitating; and a rotor position detector that detects a position of the rotor in a levitation direction. The magnetic bearing controller includes an operation current generator that generates an operation current value corresponding to a deviation between a position command value and the position of the rotor detected by the rotor position detector. The operation current generator is configured to give a predetermined initial value greater than 0 to the operation current value at a start of levitation for causing the rotor in a state where the rotating shaft of the rotor is supported by the auxiliary bearing to levitate and be positioned at a predetermined target position.

According to the above configuration, at the start of levitation of the rotor, the operation current value when the rotor supported by the auxiliary bearing is at the initial position is the predetermined initial value greater than 0. Therefore, the operation current rises (increases) steeply, and necessary electromagnetic force for causing the rotor to separate from the auxiliary bearing is generated. As a result, the rotor levitates promptly, and at the start of levitation of the rotor, the rotor can be suppressed from vibrating on the auxiliary bearing or repeatedly separating from and coming into contact with the auxiliary bearing.

The operation current generator may include an initial value adder that adds the initial value to a value that is based on the deviation between the position command value and the position of the rotor. Alternatively, the operation current generator may include an integrator that integrates the deviation between the position command value and the position of the rotor, and the predetermined initial value greater than 0 may be set as an initial value of the integrator. In this case, at the start of levitation of the rotor, the operation current value rises directly and steeply regardless of the position command value. Thus, such an operation current value that an electric current that generates necessary electromagnetic force for causing the rotor to separate from the auxiliary bearing rises steeply can be readily generated without changing the position command value.

The operation current generator may be configured to generate the operation current value at the start of the levitation by using the position command value that has such a waveform that a step input waveform is superposed on a ramp input waveform. In this case, at the start of levitation of the rotor, the position command value rises in a stepped manner. Consequently, the generated operation current value rises indirectly and steeply. Thus, such an operation current value that an electric current that generates necessary electromagnetic force for causing the rotor to separate from the auxiliary bearing rises steeply can be readily generated by merely changing the position command value.

A magnetic bearing control method according to another aspect of the present invention is a magnetic bearing control method of controlling a magnetic levitation motor including: a rotor; a pair of electromagnets that causes the rotor to levitate by electromagnetic force; an auxiliary bearing that supports a rotating shaft of the rotor when the rotor is stopped; and a rotor position detector that detects a position of the rotor in the predetermined direction. The magnetic bearing control method includes: generating an operation current value corresponding to a deviation between a position command value and the position of the rotor detected by the rotor position detector; and giving a predetermined initial value greater than 0 to the operation current value at a start of levitation for causing the rotor in a state where the rotating shaft of the rotor is supported by the auxiliary bearing to levitate and be positioned at a predetermined target position.

According to the above method, at the start of levitation of the rotor, the operation current value when the rotor supported by the auxiliary bearing is at the initial position is the predetermined initial value greater than 0. Therefore, the operation current rises (increases) steeply, and necessary electromagnetic force for causing the rotor to separate from the auxiliary bearing is generated. As a result, the rotor levitates promptly, and at the start of levitation of the rotor, the rotor can be suppressed from vibrating on the auxiliary bearing or repeatedly separating from and coming into contact with the auxiliary bearing.

Advantageous Effects of Invention

The present invention makes it possible to suppress the rotor from, for example, vibrating on the auxiliary bearing and repeatedly separating from and coming into contact with the auxiliary bearing at the start of levitation of the rotor.

DESCRIPTION OF EMBODIMENTS

Figure 1:
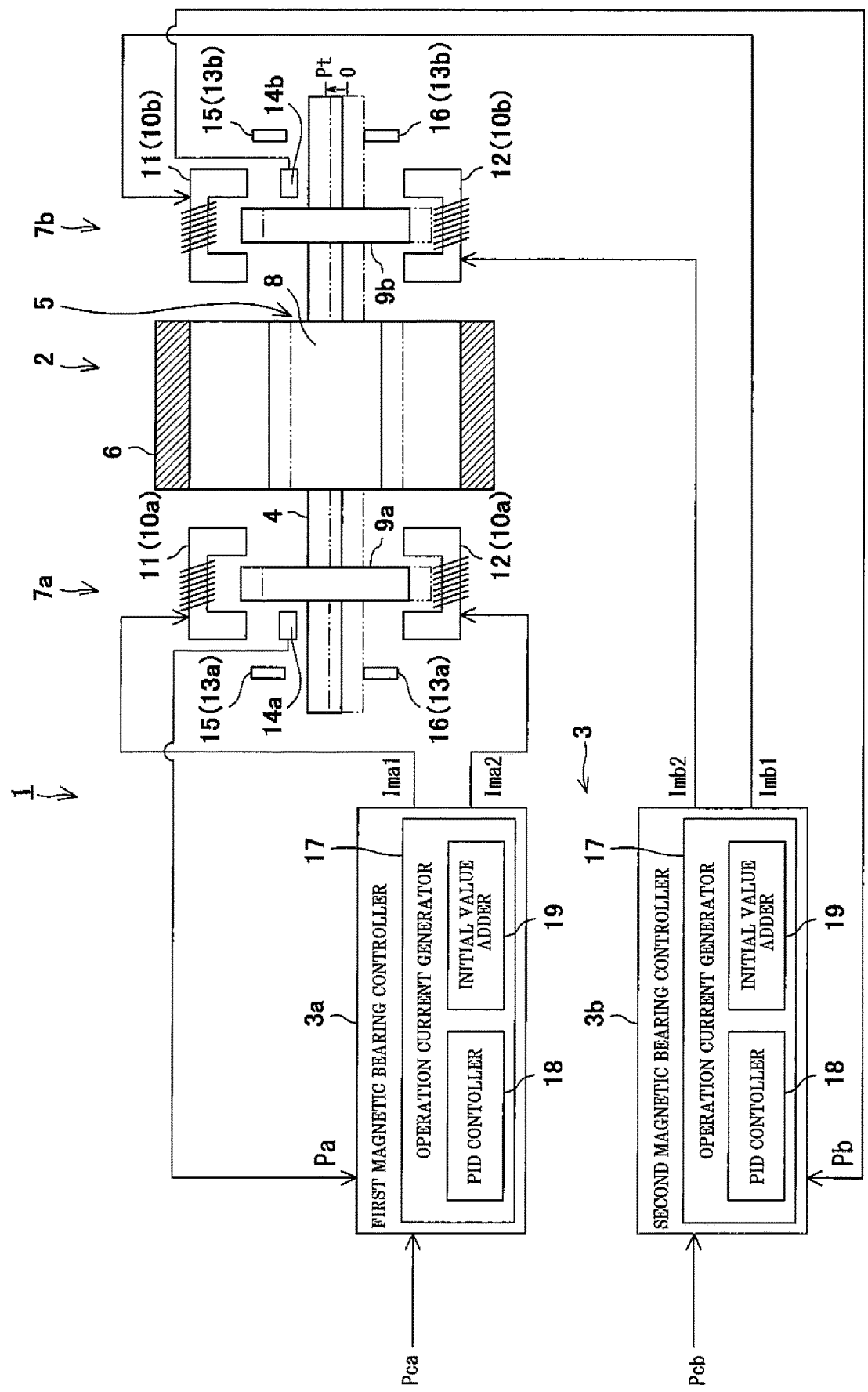
FIG. 1 is a block diagram showing a schematic configuration of a magnetic levitation motor system to which a magnetic bearing controller according to Embodiment 1 of the present invention is applied.

Hereinafter, embodiments of the present invention are described in detail with reference to the drawings. In the drawings, the same or corresponding elements are denoted by the same reference signs, and repeating the same descriptions is avoided below.

Embodiment 1

FIG. 1 is a block diagram showing a schematic configuration of a magnetic levitation motor system to which a magnetic bearing controller according to Embodiment 1 of the present invention is applied. A magnetic levitation motor system 1 is utilized as an aeration blower for use in, for example, a water treatment system. In the present embodiment, the magnetic levitation motor system 1 includes a magnetic levitation motor 2 and a magnetic bearing control device 3.

The magnetic levitation motor 2 includes a rotor 5, a stator 6, and a pair of magnetic bearing mechanisms 7a and 7b. The rotor 5 includes: a rotating shaft 4 extending in the horizontal direction; a rotor body 8 fixed to the rotating shaft 4; and a pair of bearing-corresponding portions 9a and 9b fixed to the rotating shaft 4 on both sides of the rotor body 8 in the axial direction of the rotor body 8. These components 4, 8, 9a and 9b of the rotor 5 integrally rotate about the rotating shaft 4.

The pair of magnetic bearing mechanisms 7a and 7b includes an electromagnet pair 10a and an electromagnet pair 10b, which are disposed corresponding to the pair of bearing-corresponding portions 9a and 9b. The electromagnet pair 10a and the electromagnet pair 10b each include a pair of electromagnets (an upper electromagnet 11 and a lower electromagnet 12) that are disposed above and below the rotating shaft 4 of the rotor 5, respectively. In the pair of magnetic bearing mechanisms 7a and 7b, the mechanisms 7a and 7b respectively include: auxiliary bearings 13a and 13b, which prevent displacement of the rotating shaft 4 of the rotor 5 from its proper position; and rotor position detectors 14a and 14b, each of which detects the position of the rotor 5 in the levitation direction (the position of the rotor 5 in the vertical direction). Each of the rotor position detectors 14a and 14b is constituted by, for example, a rotary encoder.

Each of the auxiliary bearings 13a and 13b includes an upper auxiliary bearing 15 and a lower auxiliary bearing 16. The lower auxiliary bearings 16 of the respective auxiliary bearings 13a and 13b support the rotating shaft 4 of the rotor 5 (as indicated by imaginary line in FIG. 1) when the rotor 5 is stopped. The position of the rotor 5 in the vertical direction (the axial position of the rotating shaft 4 in FIG. 1)

when the rotor 5 is in the state of being supported by the lower auxiliary bearings 16 (i.e., when the rotor 15 is in a stopped state) is assumed to be 0.

The magnetic bearing control device 3 includes: a first magnetic bearing controller 3a, which performs control of the first magnetic bearing mechanism 7a; and a second magnetic bearing controller 3b, which performs control of the second magnetic bearing mechanism 7b. The magnetic bearing controller 3a includes an operation current generator 17, which generates an operation current value Ima corresponding to a deviation between a position command value Pca and a rotor position Pa detected by the rotor position detector 14a. Similarly, the magnetic bearing controller 3b includes an operation current generator 17, which generates an operation current value Imb corresponding to a deviation between a position command value Pcb and a rotor position Pb detected by the rotor position detector 14b.

The magnetic bearing controller 3a generates an upper electric current Ima1 to be applied to the corresponding upper electromagnet 11 and a lower electric current Ima2 to be applied to the corresponding lower electromagnet 12, based on the operation current value Ima generated by the operation current generator 17, and outputs the upper and lower electric currents Ima1 and Ima2 to the upper and lower electromagnets 11 and 12, respectively. Similarly, the magnetic bearing controller 3b generates an upper electric current Imb1 to be applied to the corresponding upper electromagnet 11 and a lower electric current Imb2 to be applied to the corresponding lower electromagnet 12, based on the operation current value Imb generated by the operation current generator 17, and outputs the upper and lower electric currents Imb1 and Imb2 to the upper and lower electromagnets 11 and 12, respectively. As a result of these electric currents being applied to the upper electromagnets 11 and the lower electromagnets 12, the electromagnet pairs 10a and 10b generate electromagnetic force, thereby causing the rotor 5 to levitate. The magnetic bearing controllers 3a and 3b perform levitation control of the rotor 5 by generating the operation current values Ima and Imb such that the rotor positions Pa and Pb detected by the rotor position detectors 14a and 14b coincide with the position command values Pca and Pcb, respectively.

After the rotor 5 has levitated, a drive control device (not shown) performs rotation control of the rotor 5. It should be noted that the magnetic bearing control device 3 (3a, 3b) and the drive control device may be realized by the same control device, or may be configured as different control devices from each other. Also, the first magnetic bearing controller 3a and the second magnetic bearing controller 3b may be constituted by a single controller (e.g., a computer such as a microcontroller), or may be constituted by (two) individual controllers, respectively.

At the start of levitation for causing the rotor 5 in a state where the rotating shaft 4 of the rotor 5 is supported by the auxiliary bearings 13a and 13b (specifically, by their lower auxiliary bearings 16) to levitate and be positioned at a predetermined target position Pt (a steady rotational position of the rotor 5), each of the magnetic bearing controllers 3a and 3b performs levitation start control. In the levitation start control, each of the magnetic bearing controllers 3a and 3b is configured to give a predetermined initial value greater than 0 to the operation current value.

Figure 8:
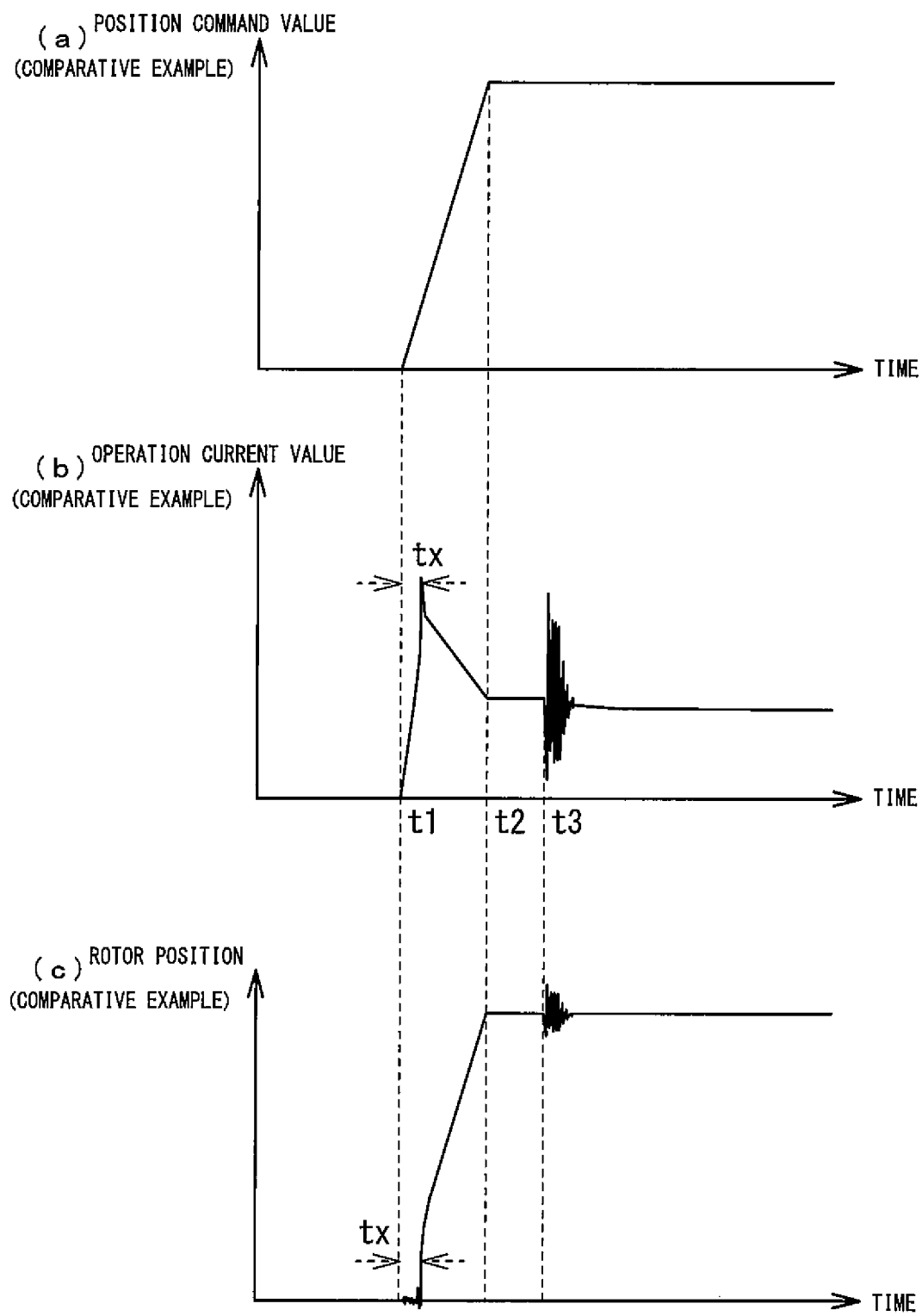
FIG. 8 illustrates graphs showing a position command value waveform, an operation current value waveform, and a rotor position waveform at the start of levitation in a comparative example.

For example, the initial value is set based on the maximum value of an operation current that is necessary for controlling the position of the rotor 5 to the same target position Pt in a conventional configuration (see the maximum value in the graph (b) of FIG. 8).

Figure 2:
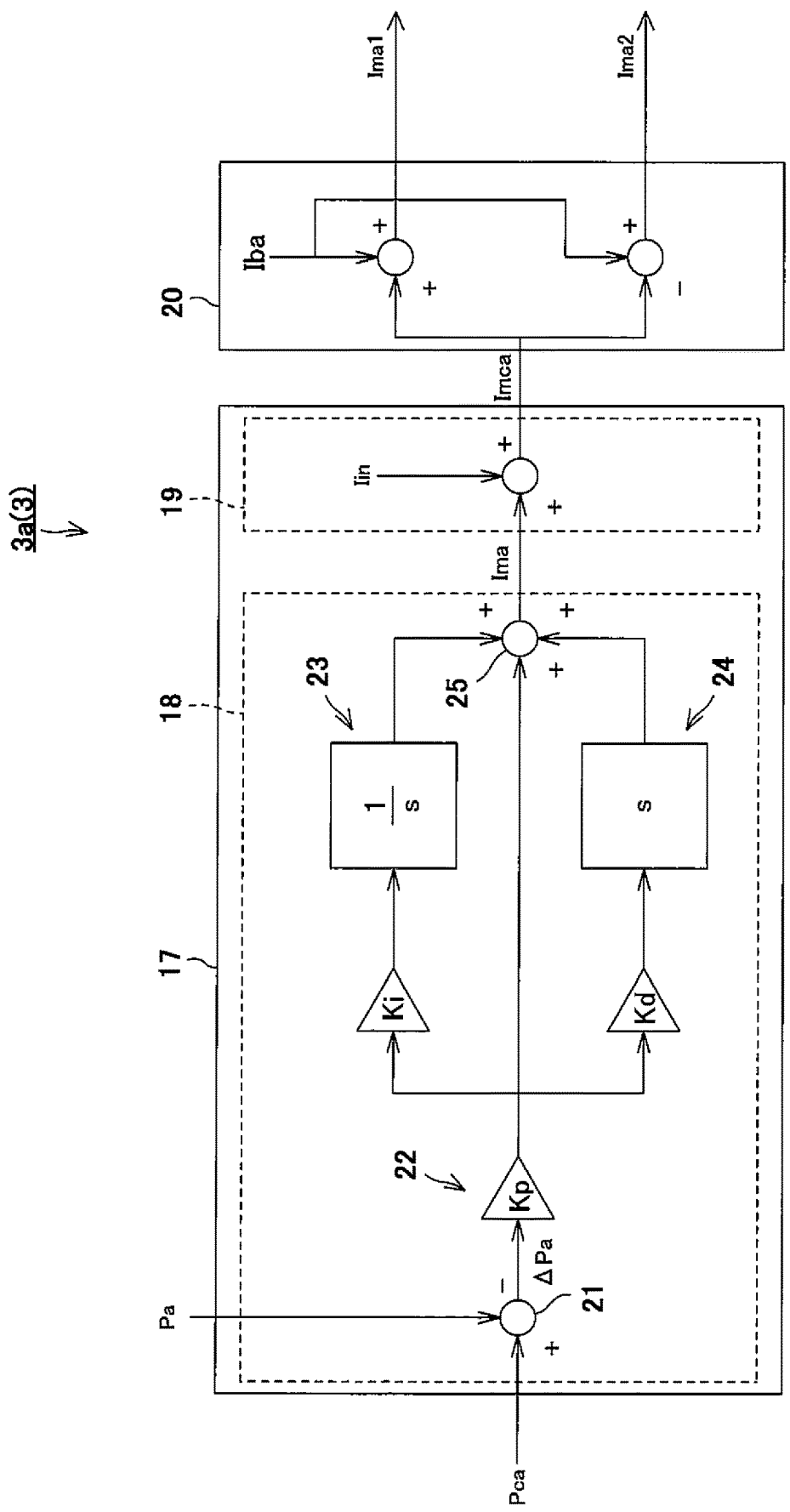
FIG. 2 shows a control block in an operation current generator of the magnetic bearing controller shown in FIG. 1.

FIG. 2 shows a control block in the operation current generator of the magnetic bearing controller shown in FIG. 1. In FIG. 2 and the description hereinafter, the operation current generator 17 in the first magnetic bearing controller 3a is mainly illustrated and described. It should be noted that the operation current generator 17 in the second magnetic bearing controller 3b has the same configuration as that of the operation current generator 17 in the first magnetic bearing controller 3a.

As shown in FIG. 2, the operation current generator 17 of the present embodiment is configured to give an initial value to the operation current value that is outputted at the start of levitation of the rotor 5. More specifically, the operation current generator 17 includes: a PID controller 18 for performing PID control on a deviation ΔPa between the position command value Pca and the rotor position Pa; and an initial value adder 19, which generates an operation current value Imca by adding an initial value Iin to the operation current value Ima generated at the start of levitation. Each of the magnetic bearing controllers 3a and 3b further includes an electric current outputter 20, which generates the upper electric current Ima1 and the lower electric current Ima2 based on the operation current value Imca outputted from the operation current generator 17. The upper electric current Ima1 is outputted to the upper electromagnet 11, and the lower electric current Ima2 is outputted to the lower electromagnet 12.

The PID controller 18 includes a subtracter 21, a proportional calculator 22, an integral calculator 23, a differential calculator 24, and an adder 25. The subtracter 21 subtracts the rotor position Pa from the position command value Pca to obtain the deviation ΔPa. The proportional calculator 22 performs proportional operation by multiplying the deviation ΔPa by a predetermined gain Kp. The integral calculator 23 performs integral operation by multiplying the deviation ΔPa by a predetermined gain Ki. The differential calculator 24 performs differential operation by multiplying the deviation ΔPa by a predetermined gain Kd. The adder 25 generates the operation current value (base value) Ima by adding up the outputs from the respective calculators 22 to 24.

The electric current outputter 20 outputs, as the upper electric current Ima1, a current value that is obtained by adding the operation current value Imca (an output from the initial value adder 19, which will be described below) to a predetermined bias current value Iba. The electric current outputter 20 also outputs, as the lower electric current Ima2, a current value that is obtained by subtracting the operation current value Imca from the predetermined bias current value Iba. In this manner, the electric current outputter 20 generates the upper electric current Ima1 to be applied to the upper electromagnet 11 and the lower electric current Ima2 to be applied to the lower electromagnet 12, based on the single operation current value Imca.

Figure 3:
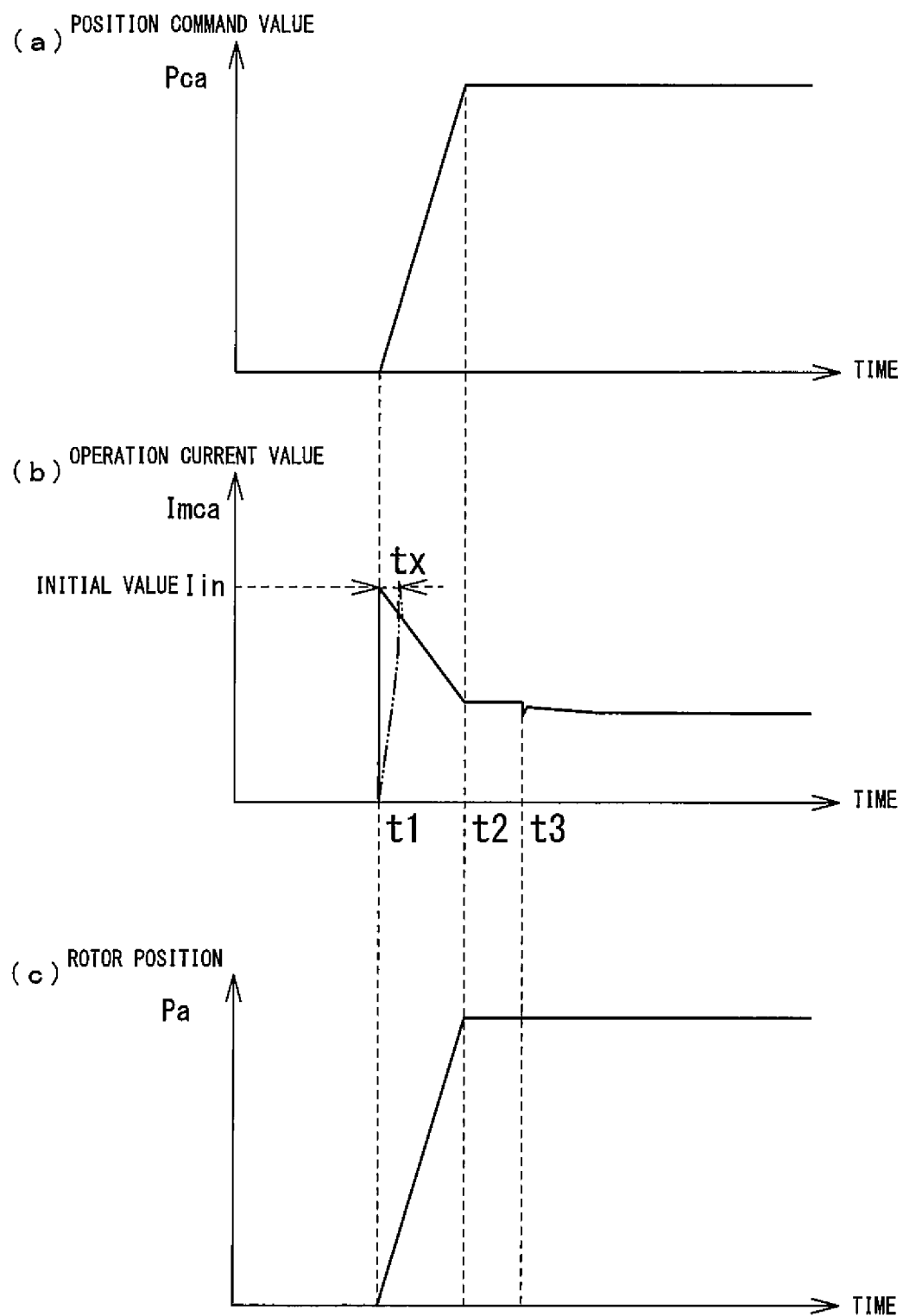
FIG. 3 illustrates graphs showing a position command value waveform, an operation current value waveform, and a rotor position waveform at the start of levitation in Embodiment 1.

The operation current value Ima outputted from the PID controller 18 is inputted to the initial value adder 19. At the start of levitation, the initial value adder 19 adds the initial value Iin to the output (the operation current value Ima) from the PID controller 18 to generate a corrected operation current value Imca for the time of start of levitation. FIG. 3 illustrates graphs showing a position command value waveform indicating temporal changes in the position command value, an operation current value waveform indicating temporal changes in the operation current value, and a rotor position waveform indicating temporal changes in the rotor position at the start of levitation in Embodiment 1. FIG. 8 illustrates graphs showing a position command value waveform, an operation current value waveform, and a rotor position waveform at the start of levitation in a comparative example. In both FIG. 3 and FIG. 8, the graph (a) indicates the position command value waveform; the graph (b) indicates the operation current value waveform; and the graph (c) indicates the rotor position waveform. It should be noted that FIG. 3 and FIG. 8 illustrate the graphs of these values in the first magnetic bearing controller 3a.

The waveform of the position command value Pca in the present embodiment and the waveform of the position command value Pca in the comparative example are the same. Specifically, the position command value Pca has such a waveform that as a result of applying an electric current to the electromagnet pair 10a of the first magnetic bearing mechanism 7a at a time t1, the rotor 5 starts levitating, and then at a time t2, the rotor 5 becomes fully levitated at the first magnetic bearing mechanism 7a (i.e., reaches the predetermined target position Pt). Accordingly, the position command value Pca increases in a ramp manner from the time t1 to the time t2 (i.e., increases linearly as the time elapses). At the time t1, the position command value Pca is 0.

In this case, as shown in FIG. 8, in the conventional configuration, the operation current value Ima generated in accordance with the position command value Pca, which increases in a ramp manner from the time t1, increases gradually from 0. Accordingly, as shown in graph (c) of FIG. 8, the actual rotor position behaves for a while (for a period tx) in such a manner that the rotor vibrates on the lower auxiliary bearing 16 or does not fully levitate and collides with the lower auxiliary bearing 16 again.

On the other hand, according to the present embodiment, as shown in FIG. 3, at the start of levitation of the rotor 5, at the time t1, even though the position command value Pca is 0, the predetermined initial value Iin greater than 0 is outputted as the operation current value Imca. Therefore, the operation current rises (increases) steeply, and necessary electromagnetic force for causing the rotor 5 to separate from the auxiliary bearing 13a (lower bearing 16) is generated. As a result, the rotor 5 levitates promptly, and as shown in the graph (c) of FIG. 3, the actual rotor position Pa follows the position command value Pca and increases in a ramp manner. Thus, according to the present embodiment, at the start of levitation of the rotor 5, the rotor 5 can be suppressed from vibrating on the auxiliary bearings 13a and 13b or repeatedly separating from and coming into contact with the auxiliary bearings 13a and 13b.

In particular, in the present embodiment, at the start of levitation of the rotor 5, the initial value Iin is added to the operation current value Ima generated by the PID controller 18. Accordingly, by merely performing the arithmetic operation of adding the initial value Iin to the operation current value Ima outputted from the existing magnetic bearing controller, an electric current (operation current value Imca) that generates necessary electromagnetic force for causing the rotor 5 to separate from the auxiliary bearing 13a rises directly and steeply. Thus, such an operation current value Imca that a necessary electric current for causing the rotor 5 to separate from the auxiliary bearing 13a rises steeply can be readily generated without changing the position command value Pca.

In the present embodiment, the second magnetic bearing controller 3b controls the second magnetic bearing mechanism 7b so as to start the levitation of the rotor 5 at the second magnetic bearing mechanism 7b after the rotor 5 has levitated to the target position Pt at the first magnetic bearing mechanism 7a. In the examples of FIG. 3 and FIG. 8, the levitation of the rotor 5 at the second magnetic bearing mechanism 7b is started (an electric current is applied to the electromagnet pair 10b) at a time t3. Also in this case, similar to the first magnetic bearing controller 3a, the second magnetic bearing controller 3b performs the control of adding the initial value Iin to the operation current value Ima generated by the PID controller 18.

In the conventional configuration, similar to the behavior of the rotor 5 at the first magnetic bearing mechanism 7a, also at the second magnetic bearing mechanism 7b, at the start of levitation control of the rotor 5, for example, the rotor 5 vibrates on the auxiliary bearing 13b, causing the entire rotor 5 to vibrate. The graph (c) of FIG. 8 shows vibration after the time t3, and this means that the vibration of the rotor 5 at the second magnetic bearing mechanism 7b is transmitted to, and thereby has an influence on, the first magnetic bearing mechanism 7a. Consequently, the operation current value Ima outputted from the first magnetic bearing controller 3a is increased and decreased greatly so as to keep the position of the rotor 5 at the first magnetic bearing mechanism 7a to the target position.

On the other hand, according to the present embodiment, the operation current value Imca outputted from the operation current generator 17 of the second magnetic bearing controller 3b is also the predetermined initial value Iin greater than 0, even though the position command value Pca is 0. Accordingly, an electric current that generates necessary electromagnetic force for causing the rotor 5 to separate from the auxiliary bearing 13b rises steeply. Consequently, an actual rotor position Pb follows the position command value Pcb, and increases in a ramp manner. Therefore, as shown in the graph (c) of FIG. 3, when the second magnetic bearing mechanism 7b starts the levitation at the time t3, fluctuation in the rotor position Pa at the first magnetic bearing mechanism 7a is suppressed. Also, as shown in graph (b) of FIG. 3, the operation current value Imca outputted from the first magnetic bearing controller 3a barely changes. This makes it possible to perform rotor position control with high precision at the start of levitation of the rotor 5, and the occurrence of damage to the rotor 5 can be prevented.

Embodiment 2

Figure 4:
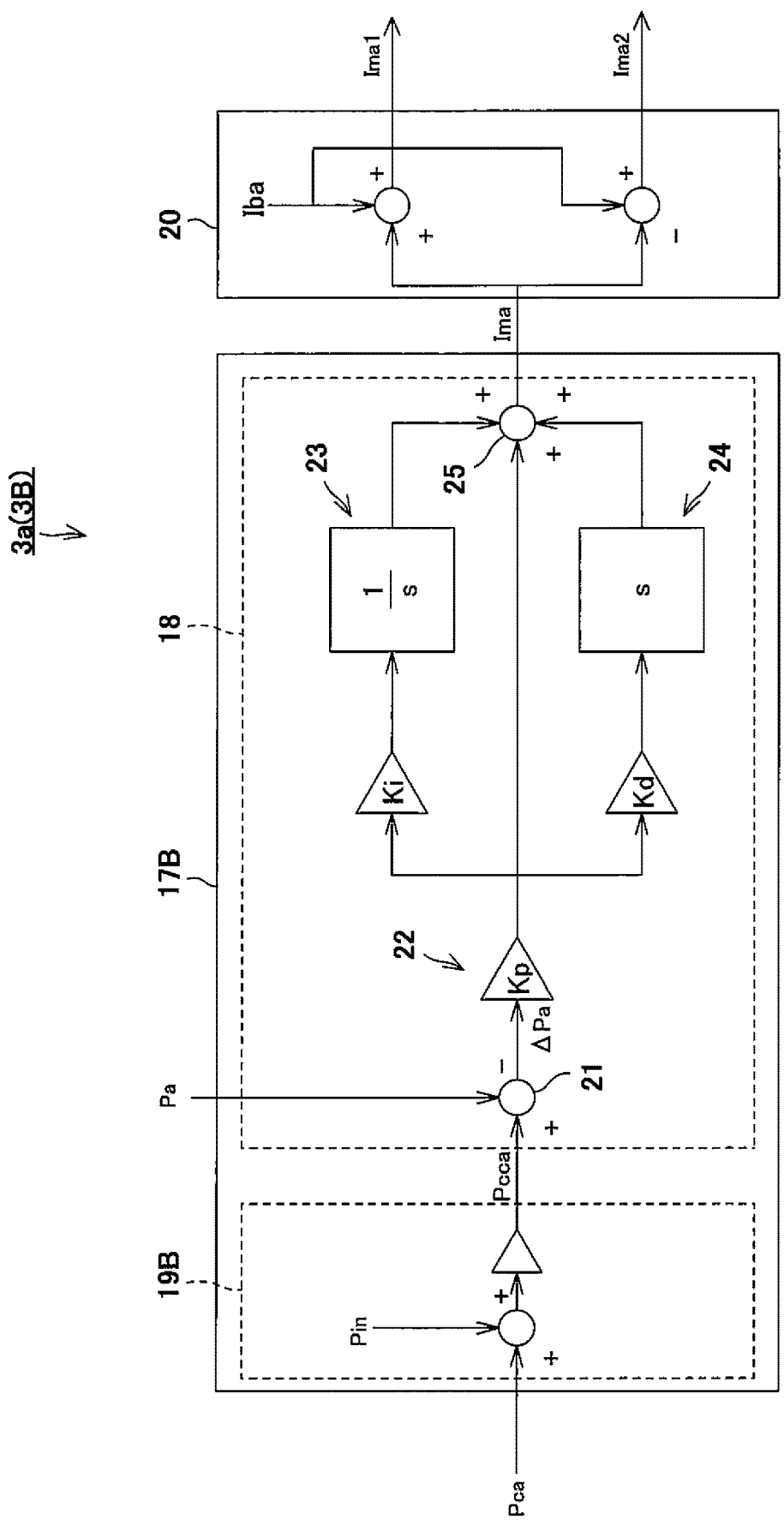
FIG. 4 shows a control block in an operation current generator of the magnetic bearing controller according to Embodiment 2 of the present invention.

Next, Embodiment 2 of the present invention is described. FIG. 4 shows a control block in an operation current generator of the magnetic bearing controller according to Embodiment 2 of the present invention. In the present embodiment, the same components as those described in Embodiment 1 are denoted by the same reference signs as those used in Embodiment 1, and the description of such components is omitted. A magnetic bearing control device 3B according to the present embodiment is different from Embodiment 1 in that, at the start of levitation, an operation current generator 17B is configured to generate the operation current value by using a position command value that has such a waveform that a step input waveform is superposed on a ramp input waveform.

More specifically, the operation current generator 17B includes an initial value adder 19B, which adds a stepped initial value Pin to the ramp position command value Pca at the start of levitation to generate a corrected position command value Pcca for the time of start of levitation. In the present embodiment, as the corrected position command value Pcca, the initial value adder 19B outputs a value that results from multiplying, by a predetermined gain, a value obtained by adding the initial value Pin to the position command value Pca. In this manner, in the corrected position command value Pcca, the magnitude of the position command value corresponding to the target position Pt is adjusted to be the same as in the original position command value Pca. The other configurational features are the same as those of the magnetic levitation motor system 1 shown in FIG. 1.

Figure 5:
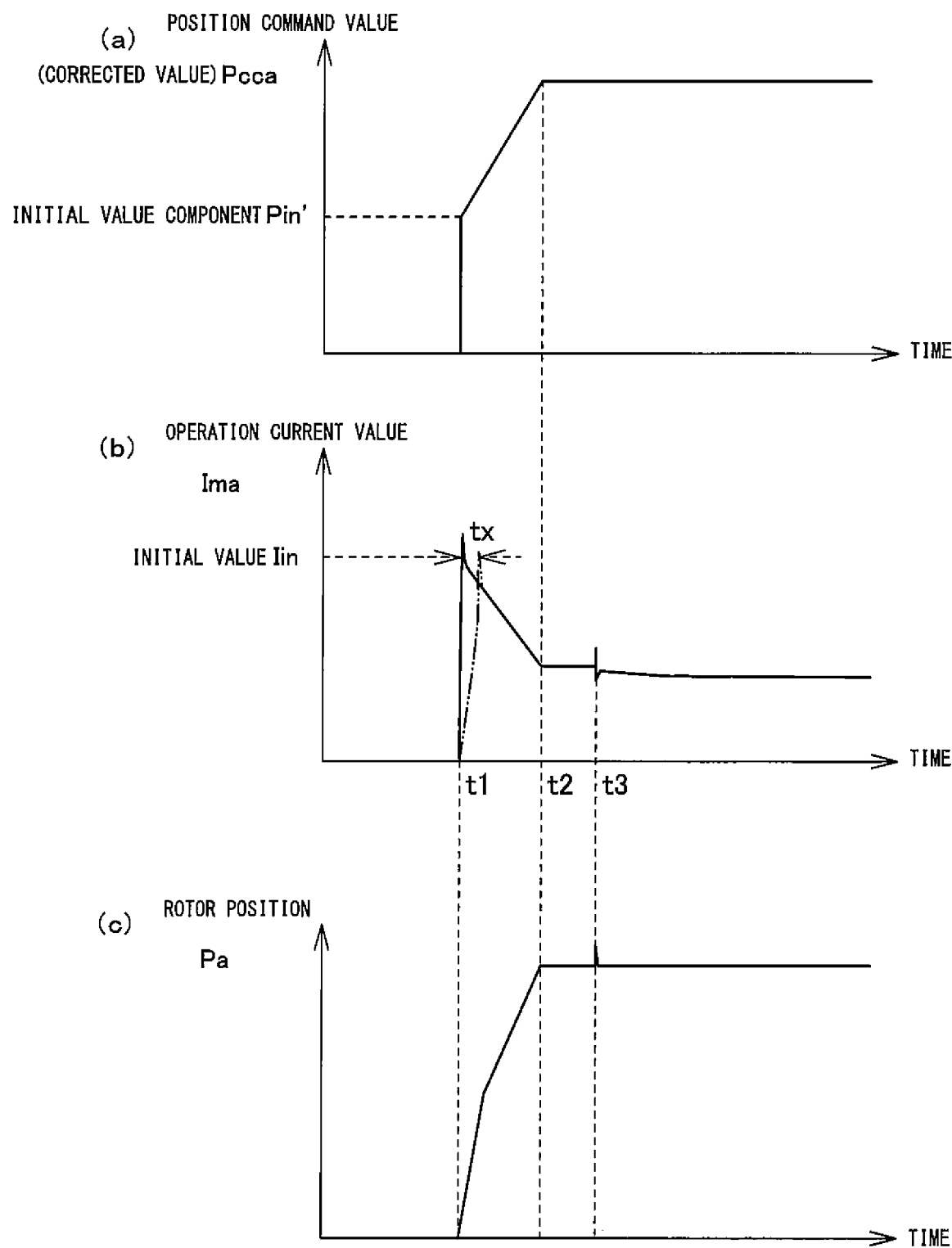
FIG. 5 illustrates graphs showing a position command value waveform, an operation current value waveform, and a rotor position waveform at the start of levitation in Embodiment 2.

FIG. 5 illustrates graphs showing a position command value waveform, an operation current value waveform, and a rotor position waveform at the start of levitation in Embodiment 2. The graph (a) in FIG. 5 shows the waveform of the corrected position command value Pcca. The waveform of the uncorrected position command value Pca is the same as the waveform shown in the graph (a) of FIG. 3.

As shown in the graph (a) of FIG. 5, at the time t1, an initial value component Pin' (a value that is obtained by performing a gain process on the stepped initial value Pin inputted to the initial value adder 19B) is added to the corrected position command value Pcca. Accordingly, as shown in graph (b) of FIG. 5, the operation current value Ima rises steeply from the time t1, and becomes substantially the same value as the initial value Iin of the operation current value in the graph (b) of FIG. 3. Consequently, as shown in the graph (c) of FIG. 5, the rotor position Pa rises immediately after the time t1 (i.e., the rotor 5 levitates immediately after the time t1).

As described above, according to the present embodiment, at the start of levitation of the rotor 5, the corrected position command value Pcca rises in a stepped manner. Consequently, the generated operation current value Ima rises indirectly and steeply. Thus, such an operation current value Ima that an electric current that generates necessary electromagnetic force for causing the rotor 5 to separate from the lower auxiliary bearings 16 of the auxiliary bearings 13a and 13b rises steeply can be readily generated by merely changing the position command value Pca into the corrected position command value Pcca by adding the initial value Pin thereto.

Variations

Although the embodiments of the present invention have been described above, the present invention is not limited to the above embodiments, and various improvements, alterations, and modifications can be made to the above embodiments without departing from the scope of the present invention.

For example, the manner of generating the operation current values Ima and Imb or Imca and Imcb is not limited to the above-described embodiments, so long as a predetermined initial value greater than 0 is given to each of the operation current values Ima and Imb at the start of levitation of the rotor 5. It should be noted that the expression "greater than 0" means that, in the electric currents applied to the electromagnet pairs 10a and 10b, the magnitude of the value of the operation current in the direction of causing the rotor 5 to levitate is a significant value that is never taken by the operation current whose value increases in a ramp manner from 0. The definition of the expression "greater than 0" may encompass not only a case where the operation current values Ima and Imb or Imca and Imcb are positive values, but also a case where the operation current values Ima and Imb or Imca and Imcb are negative values.

The above embodiments have illustratively described the mode in which the levitation control of the rotor 5 at the second magnetic bearing mechanism 7b is performed by the second magnetic bearing controller 3b after the levitation control of the rotor 5 at the first magnetic bearing mechanism 7a has been performed by the first magnetic bearing controller 3a. Alternatively, both the levitation control of the rotor 5 at the first magnetic bearing mechanism 7a and the levitation control of the rotor 5 at the second magnetic bearing mechanism 7b may be started concurrently. In this case, the magnetic bearing control device 3 may be constituted solely by the first magnetic bearing controller 3a. Specifically, the upper electric current Ima1 and the lower electric current Ima2 outputted from the first magnetic bearing controller 3a may be applied to both the electromagnet pairs 10a and 10b (specifically, to the upper electromagnets 11 and the lower electromagnets 12 of the electromagnet pairs 10a and 10b).

Further, the above embodiments have described the mode in which the upper and lower electric currents Ima1 and Ima2 are generated from one operation current value Imca or Ima, and the upper and lower electric currents Imb1 and Imb2 are generated from one operation current value Imcb or Imb. Alternatively, an operation current value for the upper electric currents Ima1 and Imb1, and an operation current value for the lower electric currents Ima2 and Imb2, may be generated individually.

Still further, the above Embodiment 1 has described the mode in which, at the start of levitation, the initial value adder 19 adds the initial value Iin to the output (the operation current value Ima) from the PID controller 18 to generate the corrected operation current value Imca for the time of start of levitation. Alternatively, the initial value adder 19 may be configured to, for example, add the initial value Iin to the output from the integral calculator 23 before the outputs from the calculators 22 to 24 are added to the adder 25 in the PID controller 18. That is, the initial value adder 19 is only required to be configured to add the initial value tin to a value that is based on the deviation ΔPa between the position command value Pca and the rotor position Pa (examples of such a value include, at least, the output from the integral calculator 23 and the operation current value Ima).

Figure 6:
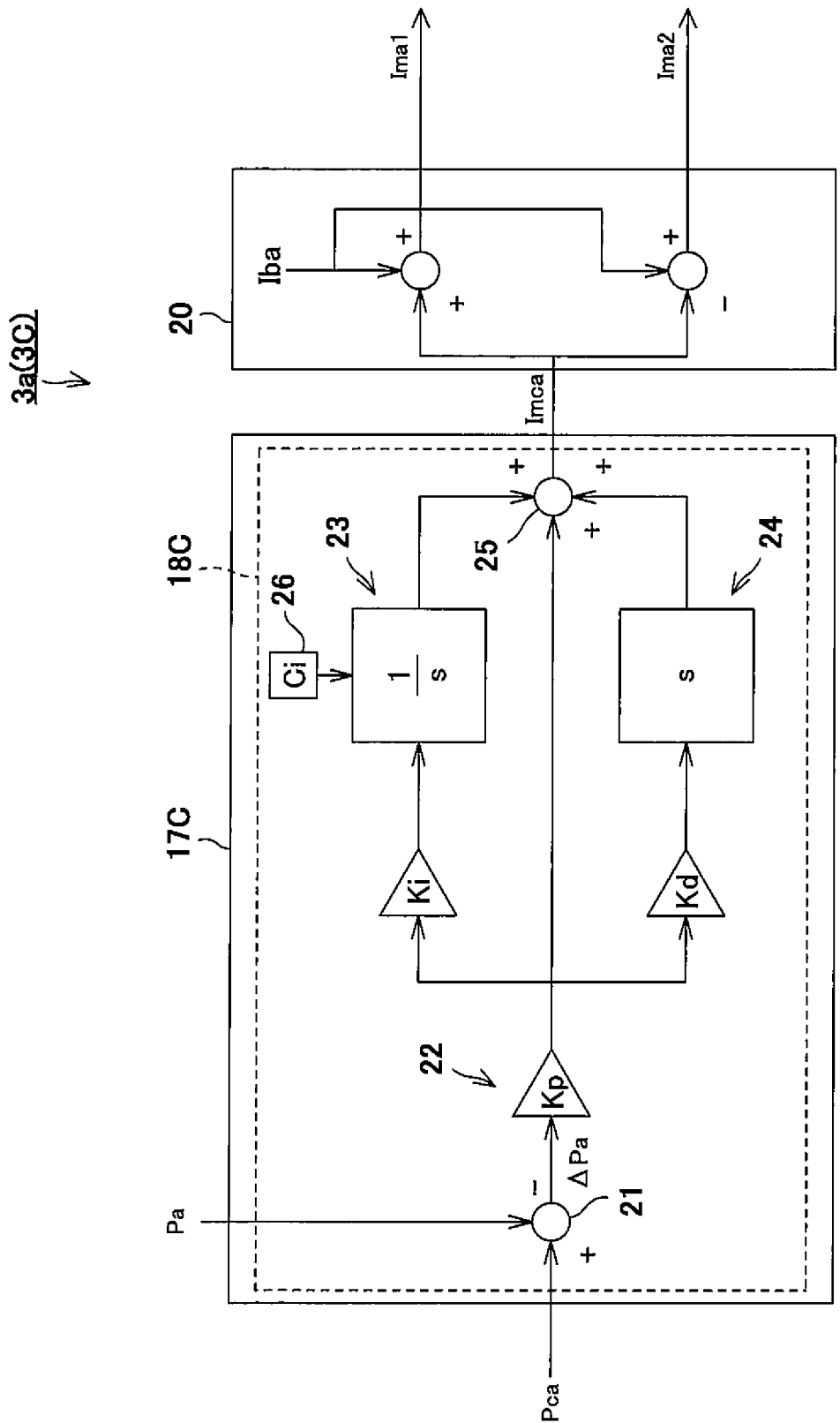
FIG. 6 shows a control block in an operation current generator of the magnetic bearing controller according to a variation of an embodiment of the present invention.

Still further, a predetermined initial value greater than 0 may be set as the initial value of the integrator 23 of the PID controller 18. FIG. 6 shows a control block in an operation current generator of the magnetic bearing controller according to a variation of an embodiment of the present invention. An operation current generator 17C of a magnetic bearing control device 3C shown in FIG. 6 includes, instead of the initial value adder 19 (see FIG. 2) of Embodiment 1, an initial value setter 26, which feeds an initial value Ci to the integrator 23 of a PID controller 18C. In this case, the output from the integrator 23 at the start of levitation control of the rotor 5 is the initial value, regardless of the deviation ΔPa between the position command value Pca and the rotor position Pa.

Still further, the above Embodiment 2 has described the mode in which, at the start of levitation, the initial value adder 19B of the operation current generator 17B adds the stepped initial value Pin to the ramp position command value Pca to generate the corrected position command value Pcca for the time of start of levitation. Alternatively, the position command values Pca and Pcb may each have such a waveform that a step input waveform is superposed on a ramp input waveform, and may be inputted to the magnetic bearing controllers 3a and 3b, respectively, Still further, the above embodiments have described examples, in which each of the operation current generators 17 and 17B includes the PID controller 18. Instead of the PID controller 18, each of the operation current generators 17 and 17B may include a PI controller that performs PI control, or may include a proportional controller that performs proportional control.

Figure 7:
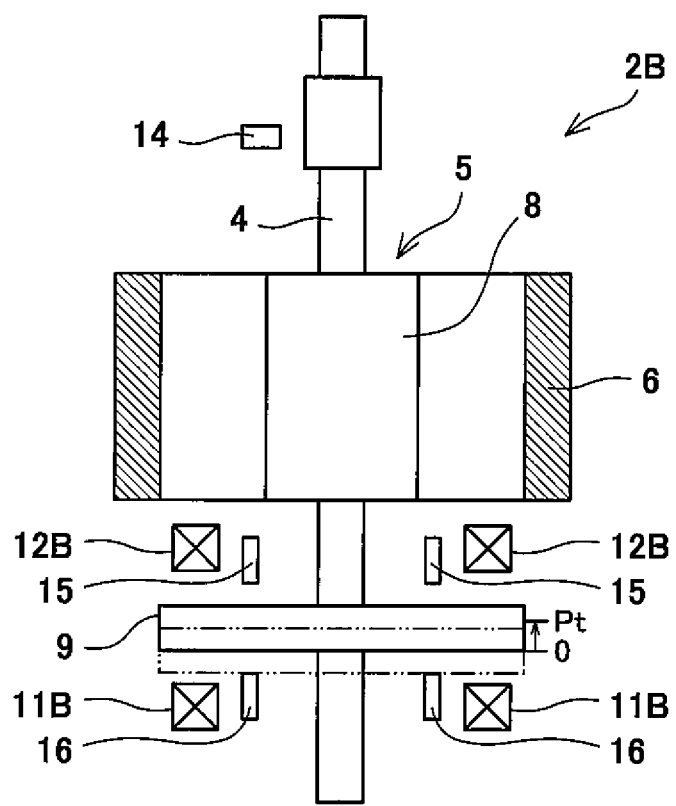
FIG. 7 shows a schematic configuration of a magnetic levitation motor according to a variation of an embodiment of the present invention.

Still further, the above embodiments have given descriptions based on the configuration in which the rotating shaft 4 of the rotor 5 extends in the horizontal direction, and each pair of electromagnets 11 and 12 is disposed such that the electromagnet 11 and the electromagnet 12 are arranged above and below the rotating shaft 4 in the vertical direction, respectively. Alternatively, the direction in which the rotating shaft 4 of the rotor 5 extends may be different from the horizontal direction. For example, as shown in FIG. 7, the rotating shaft 4 of the rotor 5 may extend in the vertical direction, and the control mode according to the present disclosure is applicable also to an axially levitated motor 2B, in which the rotor 5 levitates in the direction of the rotating shaft 4. In the example of FIG. 7, a pair of electromagnets 11B and 12B is provided at a first surface side and a second surface side of a disc-shaped bearing corresponding portion 9 provided on the rotating shaft 4 (specifically, the electromagnet 11B is provided at the first surface side, and the electro magnet 12B is provided at the second surface side). The first surface of the bearing corresponding portion 9 faces downward in the axial direction, and the second surface of the bearing corresponding portion 9 faces upward in the axial direction. It should be noted that, in the example of FIG. 7, the bearing corresponding portion 9, the pair of electromagnets 11B and 12B, and auxiliary bearings 15 and 16 are provided only below the rotor body 8, and a rotor position detector 14 is provided only above the rotor body 8. Alternatively, similar to the configuration shown in FIG. 1, these components may be provided on both sides of the rotor body 8.

As described above, the control mode according to the present disclosure is applicable to a magnetic levitation motor regardless of the levitation direction of the rotor, so long as the magnetic levitation motor includes: a pair of electromagnets that causes the rotor to levitate by electromagnetic force; an auxiliary bearing that supports the rotating shaft of the rotor when the rotor is stopped; and a rotor position detector that detects the position of the rotor in the levitation direction.

INDUSTRIAL APPLICABILITY

The present invention is useful for providing a magnetic bearing controller and a magnetic bearing control method that are capable of suppressing the rotor from, for example, vibrating on the auxiliary bearing and repeatedly separating from and coming into contact with the auxiliary bearing at the start of levitation of the rotor.

REFERENCE SIGNS LIST 2 magnetic levitation motor
3, 3a, 3b, 3B magnetic bearing control device, magnetic bearing controller
4 rotating shaft
5 rotor
11, 12 pair of electromagnets
13a, 13b auxiliary bearing
14a, 14b rotor position detector
17 operation current generator
18 PID controller
19 initial value adder

The invention claimed is:

1. A magnetic bearing controller for controlling a magnetic levitation motor, the magnetic levitation motor including: a rotor; a pair of electromagnets that causes the rotor to levitate by electromagnetic force; an auxiliary bearing that supports a rotating shaft of the rotor when the rotor is not levitating; and a rotor position detector that detects a position of the rotor in a levitation direction,
the magnetic bearing controller comprising an operation current generator that generates an operation current value corresponding to a deviation between a position command value and the position of the rotor detected by the rotor position detector, wherein
the operation current generator is configured to give, regardless of the deviation between the position command value and the position of the rotor, a predetermined initial value greater than 0 to the operation current value at a start of levitation for causing the rotor in a state where the rotating shaft of the rotor is supported by the auxiliary bearing to levitate and be positioned at a predetermined target position.

2. The magnetic bearing controller according to claim 1, wherein
the operation current generator includes an initial value adder that adds the initial value to a value that is based on the deviation between the position command value and the position of the rotor.

3. The magnetic bearing controller according to claim 1, wherein
the operation current generator includes an integrator that integrates the deviation between the position command value and the position of the rotor, and
the predetermined initial value greater than 0 is set as an initial value of the integrator.

4. The magnetic bearing controller according to claim 1, wherein
the operation current generator is configured to generate the operation current value at the start of the levitation by using the position command value that has such a waveform that a step input waveform is superposed on a ramp input waveform.

5. A magnetic bearing control method of controlling a magnetic levitation motor including: a rotor; a pair of electromagnets that causes the rotor to levitate by electromagnetic force; an auxiliary bearing that supports a rotating shaft of the rotor when the rotor is not levitating; and a rotor position detector that detects a position of the rotor in a levitation direction,
the magnetic bearing control method comprising:
generating an operation current value corresponding to a deviation between a position command value and the position of the rotor detected by the rotor position detector; and
giving, regardless of the deviation between the position command value and the position of the rotor, a predetermined initial value greater than 0 to the operation current value at a start of levitation for causing the rotor in a state where the rotating shaft of the rotor is supported by the auxiliary bearing to levitate and be positioned at a predetermined target position.

* * * * *